United States Patent [19]

Sogge

[11] Patent Number: 4,981,209

[45] Date of Patent: Jan. 1, 1991

[54] CONTAINER TRANSLATING AND ORIENTING APPARATUS AND METHOD

[75] Inventor: John W. Sogge, Orlando, Fla.

[73] Assignee: FMC Corporation, Chicago, Ill.

[21] Appl. No.: 345,798

[22] Filed: May 1, 1989

Related U.S. Application Data

[60] Division of Ser. No. 781,443, Sep. 27, 1985, Pat. No. 4,907,692, which is a continuation-in-part of Ser. No. 729,442, May 1, 1985, abandoned.

[51] Int. Cl.$^5$ .............................................. B65G 13/02
[52] U.S. Cl. ................................. 198/786; 193/35 MD
[58] Field of Search ........................... 198/786, 787; 193/35 MD, 37, 36; 414/529, 530

[56] References Cited

U.S. PATENT DOCUMENTS

| | | | |
|---|---|---|---|
| 3,356,236 | 12/1967 | Shaw et al. | 193/35 MD |
| 3,550,756 | 12/1970 | Kornylak | |
| 3,552,541 | 1/1971 | Riggs | |
| 3,645,379 | 2/1972 | Kornylak | 193/37 X |
| 3,679,043 | 7/1972 | Becker | 193/35 MD X |
| 3,710,917 | 1/1973 | Black et al. | 198/787 |
| 3,747,736 | 7/1973 | Kornylak | 198/787 X |
| 3,804,230 | 4/1974 | Krivec | 193/35 MD X |
| 3,876,255 | 4/1975 | Ilon | |
| 3,964,588 | 6/1976 | Kornylak | 193/35 MD X |
| 4,008,798 | 2/1977 | Krivec | 198/787 X |
| 4,019,627 | 4/1977 | Eggert et al. | 198/786 |
| 4,143,756 | 3/1979 | Chorlton | 198/787 X |
| 4,533,033 | 8/1985 | van Wegen | 414/757 X |

FOREIGN PATENT DOCUMENTS

| | | | |
|---|---|---|---|
| 1198735 | 8/1965 | Fed. Rep. of Germany | |
| 2225666 | 12/1973 | Fed. Rep. of Germany | 198/371 |
| 2306914 | 11/1976 | France | 198/787 |
| 0199706 | 12/1982 | Japan | 198/786 |
| 0284220 | 1/1971 | U.S.S.R. | 198/786 |
| 0578225 | 10/1977 | U.S.S.R. | 198/786 |
| 0695912 | 11/1979 | U.S.S.R. | 198/786 |

OTHER PUBLICATIONS

Article: Multi-Track From Mecanum from Rexroth International Quarterly, Int. Edition 1985, 1st Quarter.
Brochure: Conveyor Wheels, Omni-Wheels, Omni-Mat Petivey Interroll—pp. 7-10.
Article: Mecanum-The New Wonder Wheel in New Swedish Technology.
Article: New AGV with Revolutionary Movement by S. Jonsson, Mecanum AB, Sweden.

*Primary Examiner*—H. Grant Skaggs
*Assistant Examiner*—James R. Bidwell
*Attorney, Agent, or Firm*—Ronald C. Kamp; R. B. Megley

[57] ABSTRACT

An apparatus is disclosed for controlling the movement of flat bottomed articles in a plurality of different directions relative to a supporting platform. The article is supported on a plurality of clusters of helical, freely rotatable rollers mounted on a plurality of shafts. Selected ones of the shafts, or groups of shafts, each lying in one of a plurality of zones, are selectively driven in a clockwise direction, a counterclockwise direction or are held in stationary. Selective control of the shafts enable the apparatus to move the article parallel to the longitudinal axis of the platform in two selected directions, perpendicular to the longitudinal axis in two selected directions; diagonally of the longitudinal axis in four selected directions, and either clock or counterclockwise about an axis normal to the flat bottom of the article.

15 Claims, 7 Drawing Sheets

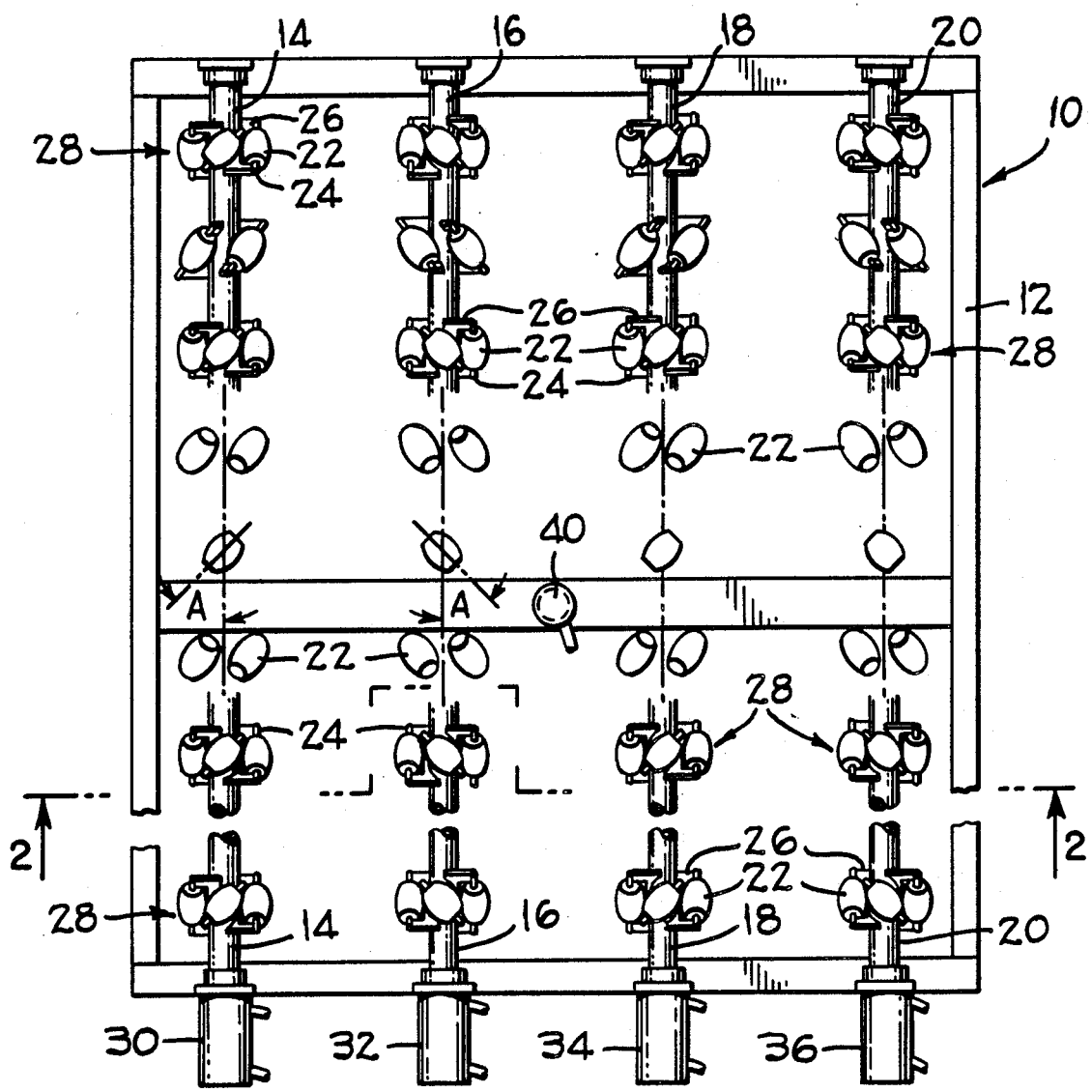
FIG_1
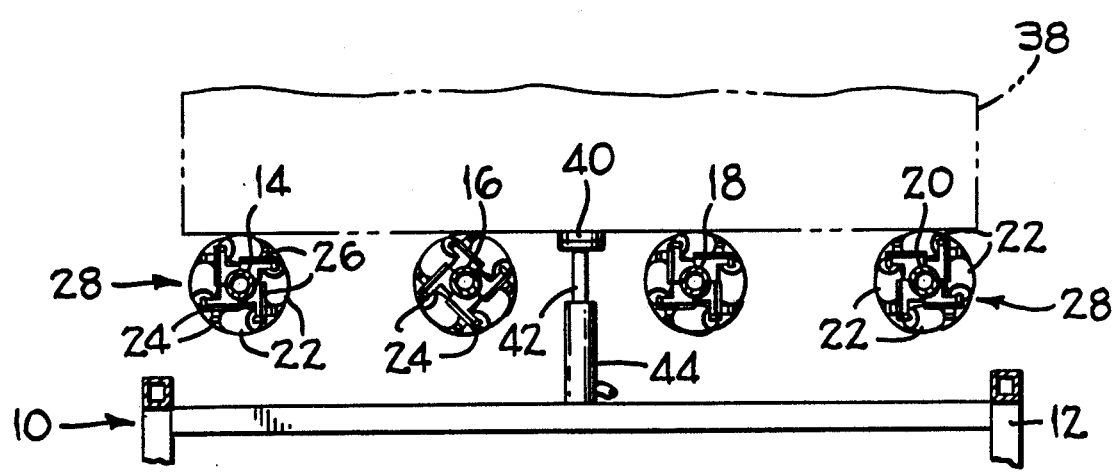
FIG_2

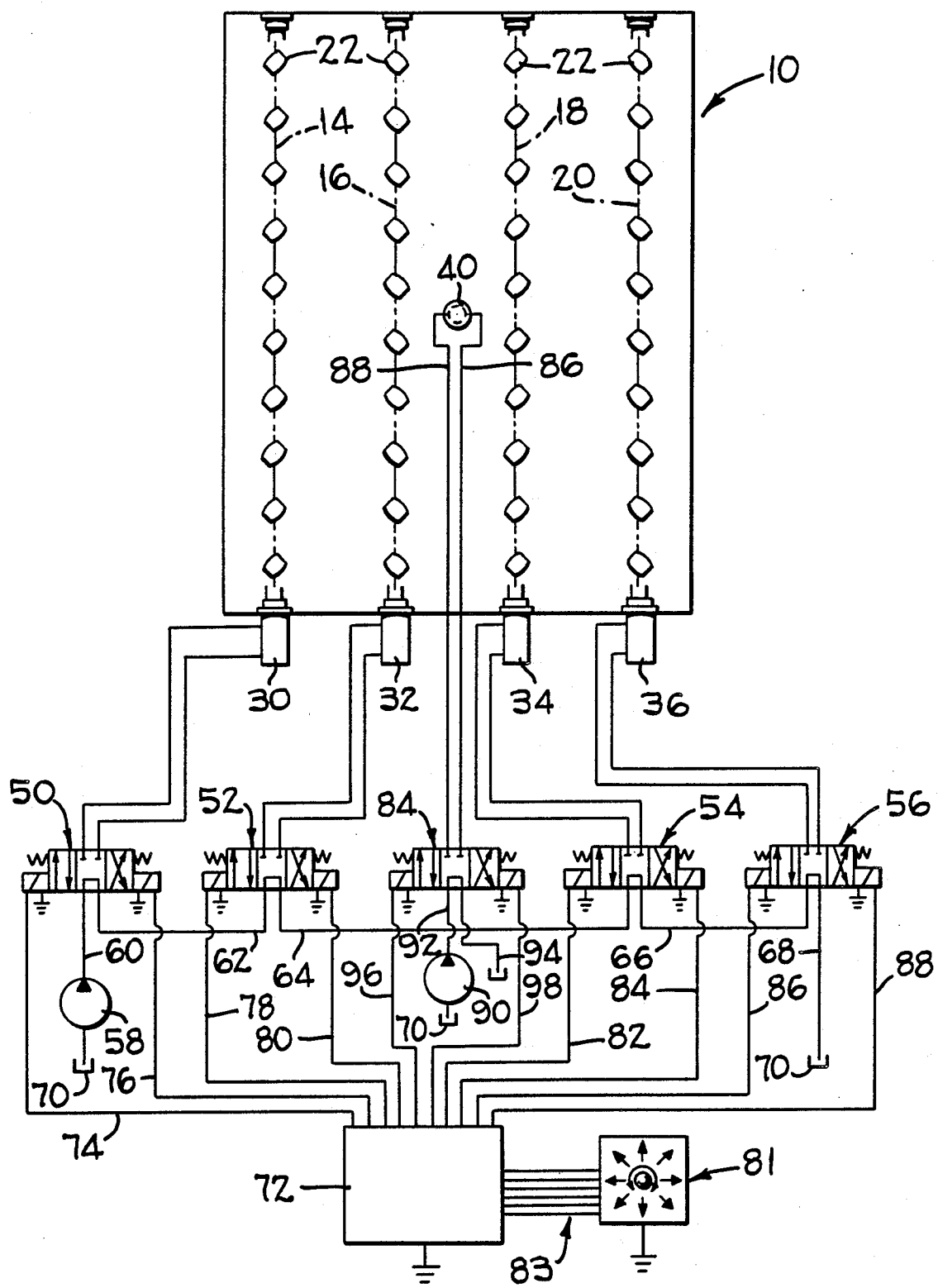
FIG_3

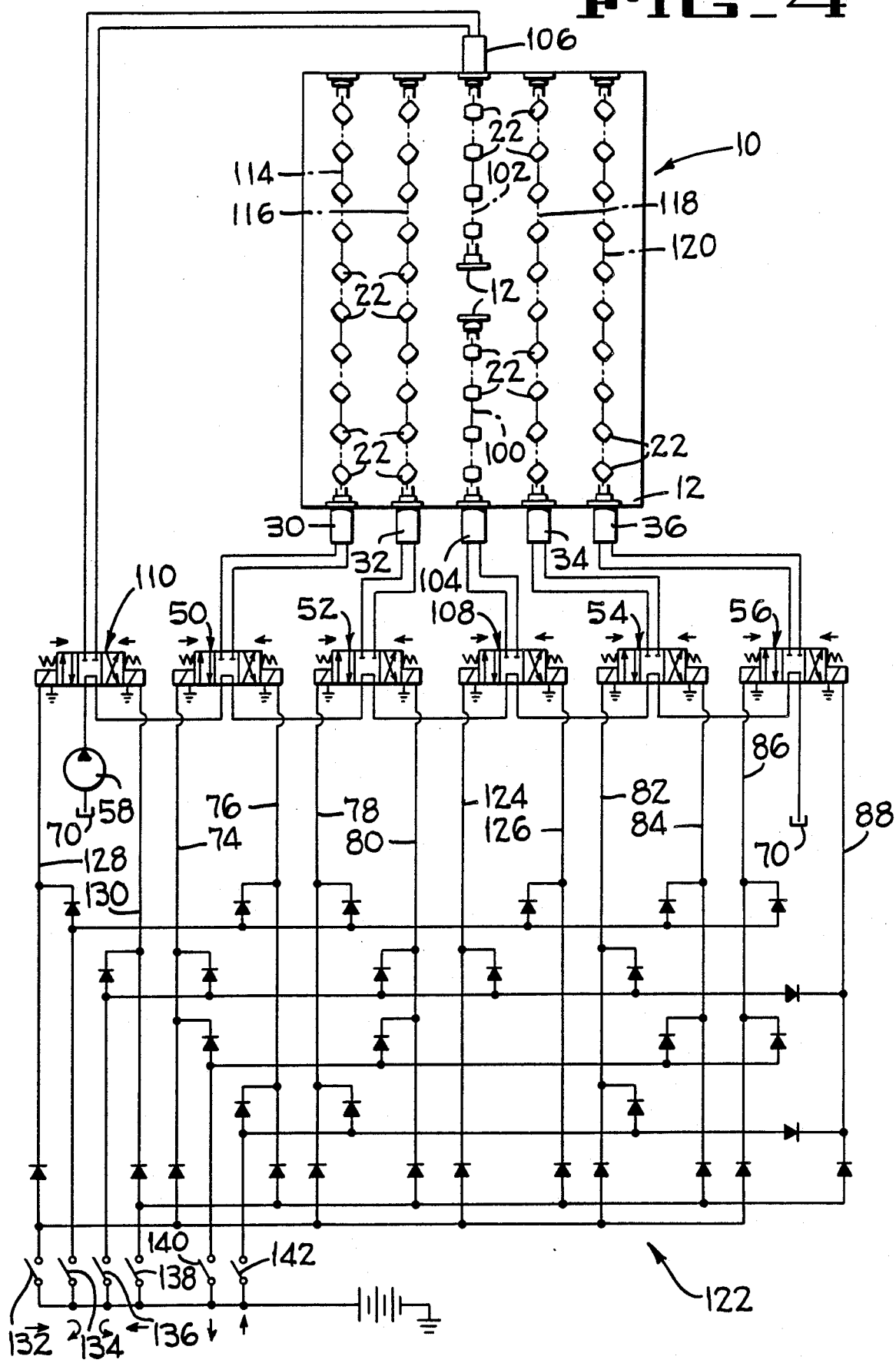
FIG_4

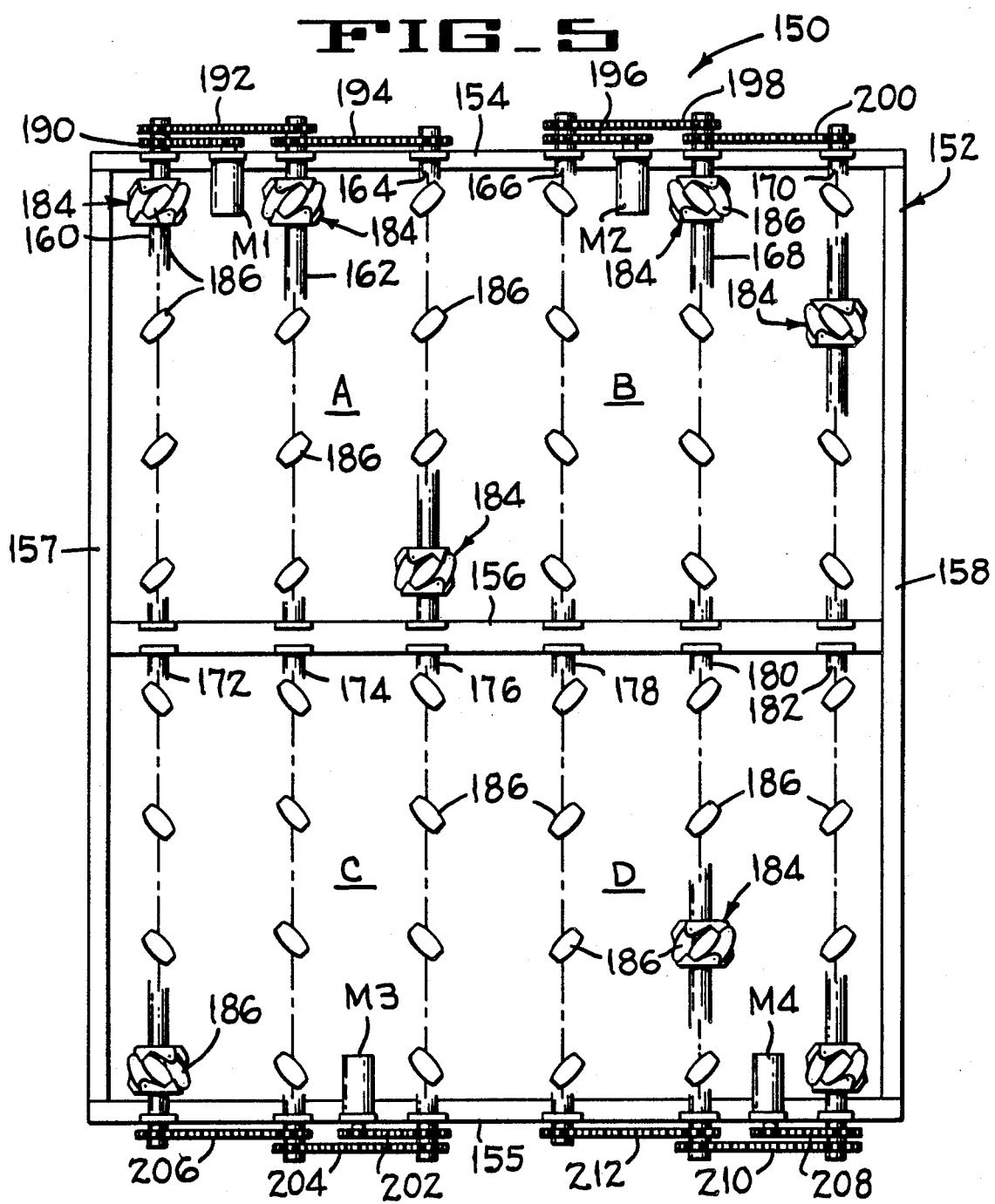
FIG_5
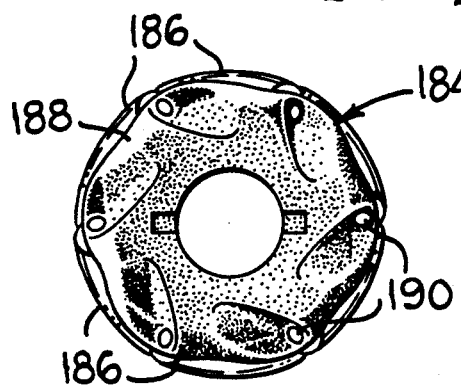
FIG_6
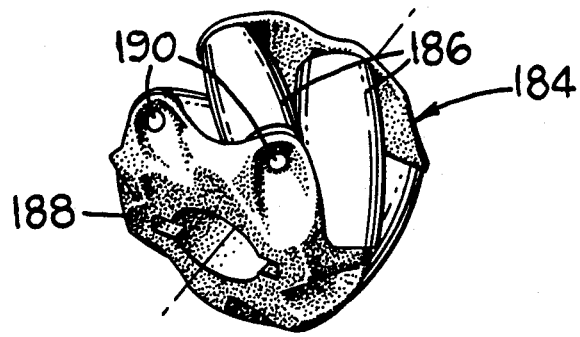
FIG_7

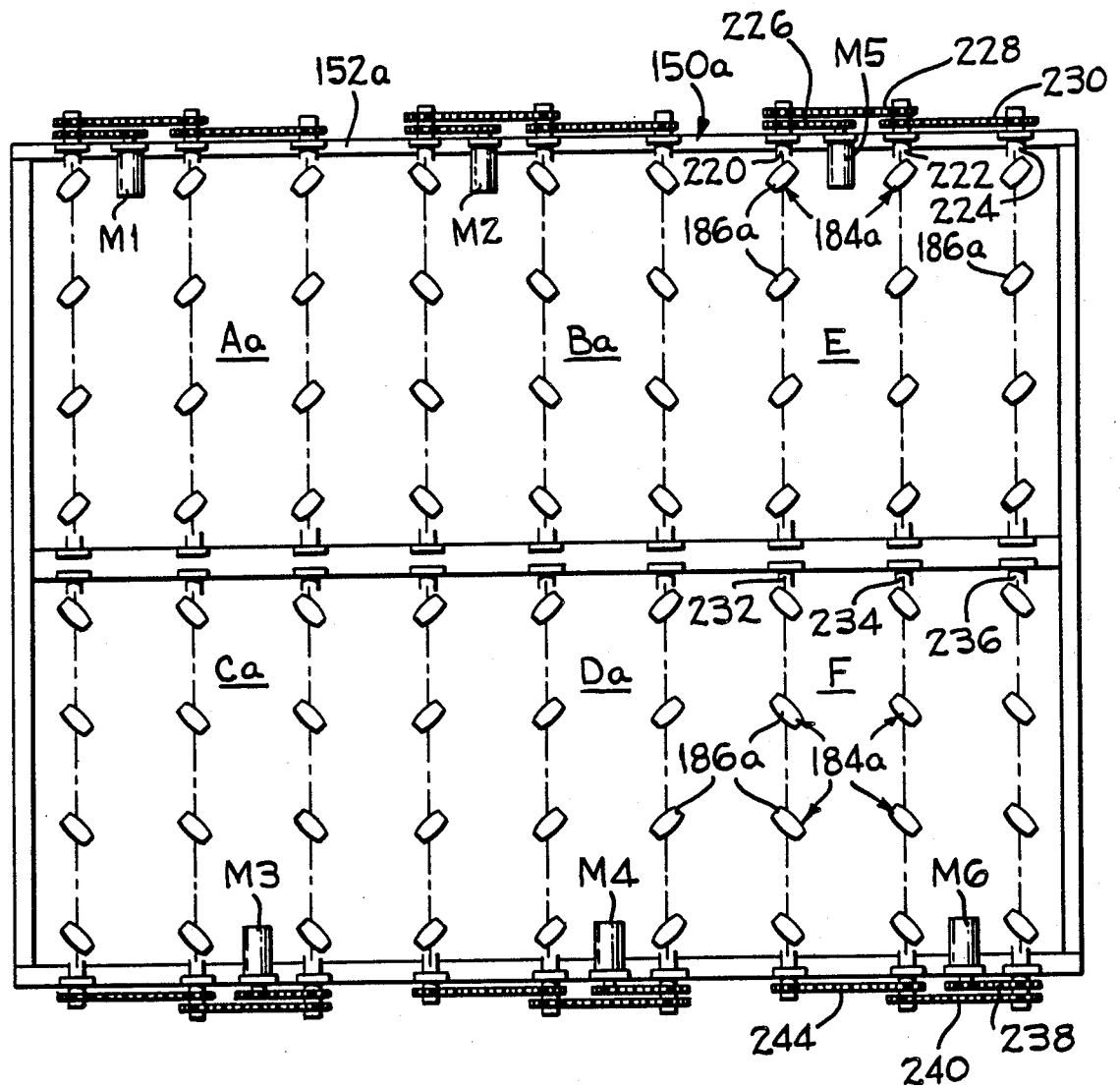

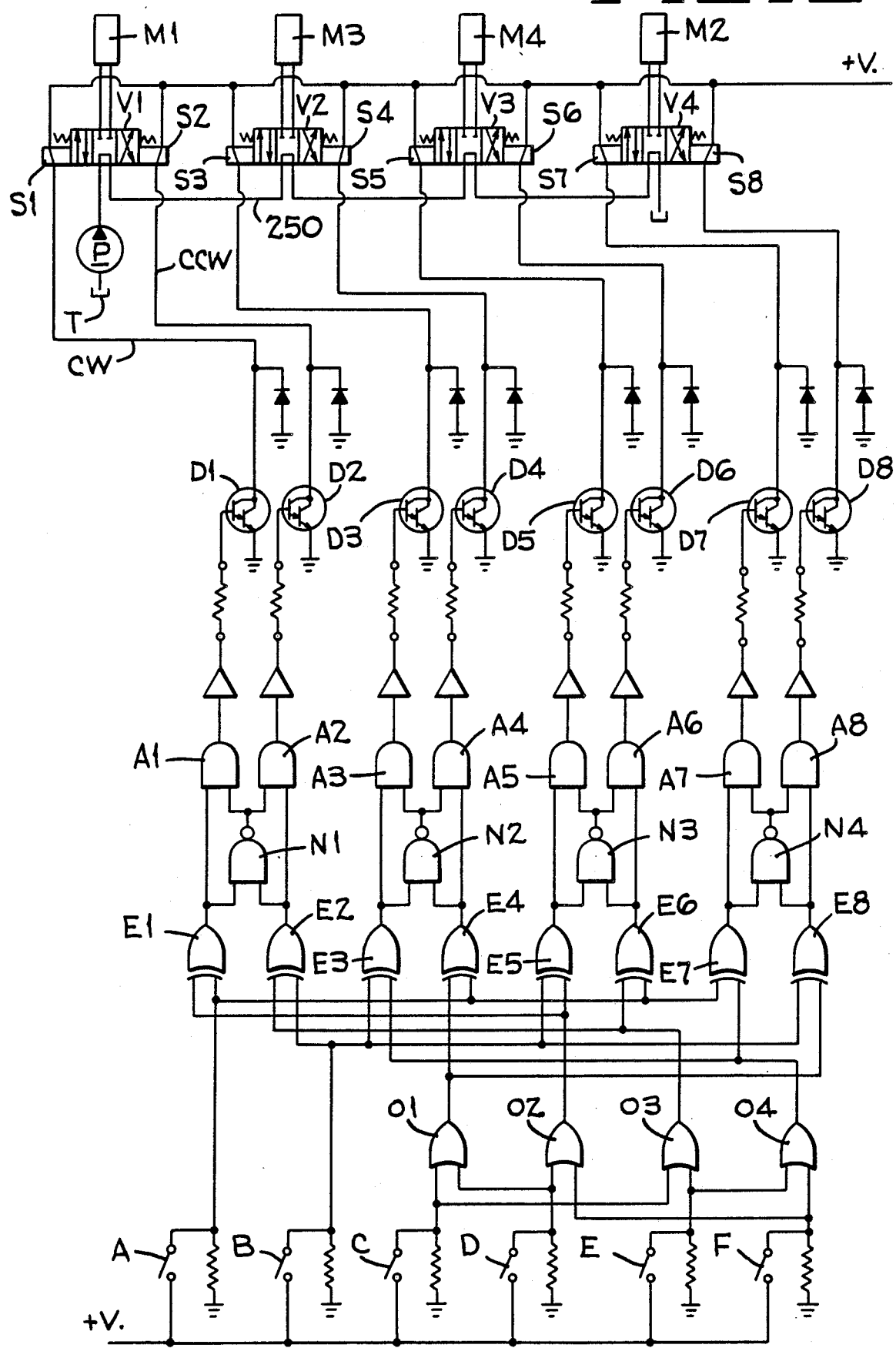
FIG_9

FIG_10

CONTAINER TRANSLATING AND ORIENTING APPARATUS AND METHOD

This is a division of application Ser. No. 781,443, filed Sept. 27, 1985, now U.S. Pat. No. 4,907,692, which is a continuation-in-part, of application Ser. No. 729,442, filed May 1, 1985, now abandoned.

This invention relates to apparatus for, and methods of, controlling the movement of containers, and more particularly to such apparatus and methods which permit movement of a container in a selected direction and/or positioning of a container in a selected orientation.

The present invention provides a conveyor means which permits a container to be translated forward and rearward, toward either side and in any diagonal direction, as well as rotated, which achieves such universal movement of a container through use of relatively simple power means, which may be easily controlled, which is durable, and which is relatively simple to manufacture and maintain. These and other advantages and attributes of the present invention will become more readily apparent from a perusal of the following description and the accompanying drawings wherein:

FIG. 1 is a top plan view of one embodiment of the present invention;

FIG. 2 is a cross-sectional view taken on line 2—2 of FIG. 1;

FIG. 3 is a view similar to FIG. 1 incorporating electrical and hydraulic schematics to illustrate the means for control thereof;

FIG. 4 is a top plan view incorporating electrical and hydraulic schematics illustrating another embodiment of the present invention.

FIG. 5 is a top plan view of a container supporting loader platform of a third embodiment of the invention.

FIG. 6 is an end elevation of one of the clusters used in the third embodiment of the invention.

FIG. 7 is a perspective of the cluster of FIG. 6.

FIG. 8 is a top plan view of a container supporting platform of a fourth embodiment of the invention.

FIG. 9 is a combined hydraulic and logic circuit for the platform of FIG. 8.

FIG. 10 is a truth table explaining the operation of the circuit of FIG. 9.

Referring now to FIG. 1 and 2, there is shown a loader platform, indicated generally at 10, such as may be utilized on an aircraft loader similar to that shown in U.S. Pat. No. 3,666,127 issued May 30, 1972. The loader platform 10 includes a frame 12 on which support members 14, 16, 18 and 20 are rotatably mounted in suitable bearings. As illustrated in FIGS. 1 and 2, the support members 14, 16, 18 and 20 are tubular shafts with a plurality of rollers 22 mounted thereon. The support members 14 and 16 comprise an outer pair of adjacent members while members 18 and 20 comprise another outer pair of adjacent members. Each roller 22 is preferably barrel shaped and made of a non-metallic material secured to a metal bushing, such as those sold by Interroll Corp. The rollers 22 are each freely rotatable on a shaft 24 extending through the bushing and attached to an appropriately shaped bracket 26 which is secured to the support member 14, 16, 18 or 20 carrying the particular roller. The rollers 22 are preferably arranged in clusters of four, as indicated at 28, with each roller being angularly spaced 90 degrees from the adjacent roller in the cluster. While the rollers in each cluster may be aligned along each member with the rollers in the other cluster, it has been found that smoother movement of the container is achieved by angularly offsetting each cluster from its adjacent cluster by about 30 degrees. The rotational axis of each roller is inclined relative to the longitudinal or rotational axis of the support member on which that roller is mounted. The rollers on support members 14 and 16 are inclined in opposite directions, as are the rollers on support members 18 and 20, but with the angles of inclination, as shown at A, being equal. Preferably, this angle of inclination is 45 degrees.

Rotary hydraulic motors 30, 32, 34 and 36 are mounted on the frame 12 and are connected to independently drive the support members 14, 16, 18 and 20 respectively. Selective actuation of these motors and their direction of rotation will cause a container to be translated or moved left or right, i.e., transverse to the longutidinal axes of the support members, in any one of four diagonal directions, toward the top or bottom, i.e., in a direction parallel to the longitudinal axes of the support members, or to be rotated or pivoted about a vertical axis in either direction. Movement of the container 38 toward the right will result when all of the motors 30, 32, 34 and 36 being rotated in a clockwise direction and toward the left when all of the motors are driven in a counterclockwise direction. The container 38 will be moved diagonally toward the upper right, as viewed in FIG. 1, when only the motors 30 and 34 are actuated to rotate the support members 14 and 18 in a clockwise direction, and toward the lower left when these members 14 and 18 are rotated counterclockwise. The container will be moved diagonally toward the lower right when only the members 16 and 20 are rotated clockwise and diagonally toward the upper left when rotated counterclockwise.

By rotating the members 14 and 18 clockwise and the members 16 and 20 counterclockwise, the container will move toward the top of the platform, as viewed in FIG. 1, longitudinally of the members 14, 16, 18 and 20. Rotation of these members in the opposite direction will cause the container to move toward the bottom of the platform. Rotation of the container in a clockwise direction about a vertical axis is achieved by rotating the member 14 clockwise and the member 16 clockwise while simultaneously rotating the member 18 counterclockwise and the member 20 clockwise. Rotation of the container in a counterclockwise direction about a vertical axis is achieved by reversing the direction of rotation of all of the support members. The rotation of the container 38 about a vertical axis may be enhanced by providing a centering pad 40 which is attached to the rod 42 of a hydraulic ram, the cylinder 44 of which is secured to the frame 12 and positioned centrally thereof. During rotation mode of operation, the ram is extended to bring the pad 40 into frictional contact with the bottom of the container and the frictional forces created by movement of the container as it rotates tends to center the container on the platform.

The foregoing description of the directions of rotation necessary to achieve the various modes of operation are a result of the particular orientation or angle of inclination of the rollers shown in FIG. 1. It should be noted that an individual shaft will impart a longitudinal component as a result of the angular orientation of the rollers on that shaft and all of the modes of operation described hereinabove can be achieved as long as the rollers on the outer pairs of members are inclined in opposite directions.

Referring now to FIG. 3, the motors 30, 32 34 and 36 are each connected through a pair of hydraulic lines to valves 50, 52, 54 and 56 respectively. These valves are conventional solenoid-operated, 3 position, 4 port valves. Each valve blocks the hydraulic lines to the associated motor in the center position so that the motors are hydraulically locked. This prevents the members 14, 16, 18 and 20 from free wheeling and thus precludes a container from rolling off of an unlevel platform under the influence of gravity. The valves are connected in series with hydraulic fluid pressure provided by pump 58 to the supply port of valve 50 through conduit 60, conduit 62 connecting the return port of valve 50 to the supply port of valve 52, conduit 64 connecting the return port of valve 52 to the supply port of valve 54 and conduit 66 connecting the return port of valve 54 to the supply port 56. A conduit 68 connects the return port of valve 56 to the reservoir 70. The series connection of the valves 50, 52, 54 and 56 insures that the hydraulic motors will operate at the same rotational speed, which in turn insures that the support members 14, 16, 18 and 20 will rotate at equal speeds. The solenoids of valve 50 are connected to a controller 72 by electrical conductors 74 and 76. The solenoids of valve 52 are connected to the controller 72 by means of conductors 78 and 80, as are the solenoids of valve 54 through conductors 82 and 84 and the solenoids of 56 through conductors 86 and 88. The controller 72, which may be of the type sold by Mitsubishi Electric Corporation as their Model MELSEC F-40M Programmable Controller, energizes the solenoids on those valves necessary to achieve the proper rotational direction of those members required for the desired movement of the container. A convenient input control device is a joy stick, indicated generally at 81 which is connected to the controller 72 through a plurality of conductors 83.

The hydraulic cylinder 44 is connected to a solenoid-operated valve 84 through hydraulic conduits 86 and 88. The cylinder 44 is a conventional double acting cylinder, but a single acting cylinder would function as well if the force of gravity is sufficient to retract the rod when the rod end side of the cylinder is connected to reservoir. The valve 84, as shown, is identical to the other valves, which is convenient when arranging them in a valve bank, but it is not necessary to hydraulically lock the cylinder 44 when the valve 84 is in the center position. A pump 90 supplies hydraulic fluid under pressure to the supply port of valve 84 through conduit 92, and a conduit 94 connects the return port of valve 84 to reservoir 70. The solenoids of valve 84 are connected to the controller 72 by means of electrical conductors 96 and 98. This valve is shifted to extend the pad 40 into contact with the bottom of the container when a rotate command is received from the control input device 81. All other input commands result in the valve being shifted to retract the pad 40.

In the embodiment of FIG. 4, a pair of half-length members 100 and 102 are rotatably mounted on the frame 12 between the left pair of members 114 and 116 and the right pair of members 118 and 120. The half-length or stub members 100 and 102 are axially aligned and have rollers 22 rotatably mounted thereon. These rollers 22 are identical to those previously described except they have their axis of rotation oriented perpendicular to the longitudinal or rotational axis of the stub members 100 or 102 on which they are mounted. Rotary hydraulic motors 104 and 106 are connected to drive the stub members 100 and 102 respectively. The motor 104 is connected through a pair of hydraulic conduits to a valve 108 and the motor 106 is similarly connected to valve 110.

The left pair of members 114 and 116 are similar to the members 14 and 16 except that the inclination of the rollers 22 thereon is changed. The members 118 and 120 are identical to the members 18 and 20 with the inclination of the rollers being the same. As will be more fully explained hereinafter, this arrangement of the roller inclinations provides, in one direction of rotation of a container about a vertical axis, an inward component of force by each of the outermost members which tends to center the container on the platform 10.

The valves 110, 50, 52, 108, 54 and 56 are identical and are connected in series; the pump 58 supplying hydraulic fluid under pressure to the supply port of the first valve in the series and that fluid being returned to the reservoir 70 from the return port of the last valve in the series. The actual order of these valves in the series, as was the case with the arrangement shown in FIG. 3, is not critical since the series connection will insure that all motors, when activated, will operate at the same rotational speed, regardless of the number of motors operating or the direction of their rotation. The conductors 74 and 76 to the solenoids of valve 50 are connected into a logic circuit, indicated generally at 122, as are the similar conductors for valves 52, 54 and 56. The solenoid valve 108 is also provided with conductors 124 and 126 which connect into the logic circuit 122. Similarly, conductors 128 and 130 connect the solenoids of the valve 110 into the circuit 122.

The control input to the circuit 122 is represented as switches 132, 134, 136, 138, 140 and 142; the symbols below each switch indicating the movement of a container on the platform 10 resultant from closing that switch. Closing switch 132 will permit the conductors 128, 74, 78, 124, 82 and 86 to energize the solenoid associated therewith and activate all six of the hydraulic motors to rotate in a direction to move a container toward the right, i.e., transverse to the longitudinal axes of the members 114, 116, 100, 102, 118 and 120. The diodes contained within the the logic circuit 122 permit the above mentioned conductors, and only those conductors, to be energized. Similarly, closing switch 138 will energize conductor 130, 76, 80, 126, 84 and 88 causing all six motors to rotate in the same direction conveying a container to the left. Closing switch 134 will energize only conductors 128, 76, 78, 126, 84 and 86. The stub members 100 will rotate so that its upper surface is moving to the left and stub member 102 opposite so that its upper surface is moving to the right. The members 114 and 116 will counter rotate so that their upper surfaces are moving away from each other causing that portion of the container thereabove to be moved upward, as viewed in FIG. 4 The member 118 and 120 will also counter rotate so that their upper surfaces are moving away from each other. Because the roller 22 on members 118 and 120 are inclined in directions opposite to those on members 114 and 116 respectively, that portion of the container above members 118 and 120 will be moved downward. The result of this coordinated rotation of all six members will cause the container to be pivoted or rotated about a vertical axis in a clockwise direction. When switch 136 is closed, such pivoting is achieved in a counterclockwise direction, because only conductors 130, 74, 80, 124, 82 and 88 are energized. The upper surface of stub members 102 and 100 move to the left and right respectively. Members 114 and 116 counter rotate toward each other as do members 118 and 120. The portion of the container above the left pair of members 114 and 116 move downward and above the right pair of members 118 and 120 moves upward. The net result is this rotational arrangement is counterclockwise pivoting of the container. It is to be noted that a container which is initially not centered is facilitated better by counterclockwise pivoting than clockwise because both of the ounter member 114 and 120 are rotating so that the upper surfaces are moving in an inward direction during counterclockwise pivoting.

Closing switch 140 will energize only conductors 74, 80, 84 and 86. The members 114 and 116 will counter rotate toward each other, while the members 118 and 120 will counter rotate away from each other. Both the left pair 114 and 116 and the right pair 118 and 120 will therefore move a container in a downward direction longitudinally of the members. Both of the motors 104 and 106 remain hydraulically locked during this mode of operation. Closing switch 142 will energize only the conductors 76, 78, 82 and 88. The left pair of members 114 and 116 will counter rotate away from each other while the right pair 118 and 120 will counter rotate toward each other, causing a container to be moved upward. Again, the motors 104 and 106 remain hydraulically locked.

Although not illustrated in FIG. 4, additional switches and diodes could be provided to permit diagonal movement of a container. Energizing only conductors 74 and 86 will cause a container to move diagonally to the lower right., while energizing only conductors 76 and 88 will cause movement toward the upper left. All valves other than 50 and 56 remain centered and the motor associated with them hydraulically locked. Energizing only conductors 78 and 82 will cause a container to be moved diagonally to the upper right, while energizing only conductors 80 and 84 will cause a container to be moved to the lower left. It is to be noted that only members having the same angular inclination are rotated during diagonal mode of operation, all other motors being locked.

The third embodiment of the platform 150 (FIG. 5) of the present invention comprises a frame 152 including side walls 154,155, and a central wall 156 all of which are secured to end walls 157,158 and extend longitudinally of the platform. A plurality of shafts 160,162,164,166,168,170 are journaled between the side wall 154 and the central wall 156. Similarly, shafts 172,174,176,178,180 and 182 are journaled between the side wall 155 and the central wall 156.

A plurality of roller clusters 184 (FIGS. 5-7), each having six helical barrel shaped rollers 186 are rotatably mounted on a cluster casting 188 by pivot pins 190. The clusters 184 include right hand clusters and left hand clusters. The left hand clusters are mounted on shafts 166,168,170,172,174,176; and the clusters on shafts 160,162,164,178,180, and 182 are right hand clusters. As shown in FIG. 5, four clusters 184 are mounted on each shaft, with certain of the clusters being illustrated only by an uppermost one of the rollers 186 in position to engage and support the flat bottom surface of a container, pallet, flat bottomed article or the like.

The clusters 184 on shafts 160,162,164 all have the axes of their uppermost rollers 186 angled at approximately 45° angle to the right relative to the central wall 156 and lie in a container supporting zone A. The axes of the uppermost rollers 186 of the clusters 184 are secured to the shafts 178,180,182 in zone D are parallel to those in zone A. Similarly, the axes of the upper rollers 186 of the clusters keyed to shafts 166, 168, 170 in a zone B; and the axes of the upper rollers 186 keyed to shafts 172,174 and 176 in a zone C are parallel to each other and normal to the axes of the upper rollers 186 in zones A and D. Thus the clusters 184 in zones A and D are right hand clusters, while the clusters in zones B and C are left hand clusters.

As illustrated in FIG. 5, a first hydraulic motor M1 in zone A is secured to the platform frame 152 and is connected to shaft 160 by a first chain drive 190. A second chain drive 192 connects shaft 160 to shaft 162, while a third chain drive 194 connects shafts 162 and 164 together. Thus, all shafts and rollers 186 of zone A will be rotated in the same direction and at the same speed by motor M1 when driven in either direction by control means to be described hereinafter. Furthermore, when the motor M1 is driven in a clockwise direction (when observing the shafts 160,162,164 from the lower end of FIG. 5) all of the rollers 186 in zone A rotate clockwise at the same speed; and when driving the motor M1 in a counterclockwise direction all of the rollers in zone A are driven in a counterclockwise direction.

Similarly, an independently controlled reversible hydraulic motor M2 drives shafts 166,168, 170 of zone B through chain drives 196,198,200, in the same direction and at the same speed either in a counterclockwise or clockwise direction. A hydraulic motor M3 drives the shafts 172,174,176 and rollers 186 in zone C at the same speed and in the selected direction by chain drives 202,204,206 depending upon the direction of rotation of the motors M3; and a hydraulic motor M4 drives shafts 178,180,182 and their rollers 186 of zone D through chain drives 208,210,212, in the selected direction and at the same speed.

As will be described hereinafter, all of the motors, when driven, will drive the rollers in their zones in the selected direction and at the same speed as the rollers in one or more of the other zones.

Prior to describing the several directions in which a container (or other flat bottomed articles) may be propelled while supported on the rollers 186, it is believed that it would be helpful in understanding the invention to briefly describe the driving forces exerted by the freely rotatable rollers 186 on the bottom of the containers.

Having reference to FIG. 5, if the motor M1 drives all clusters 184 and thus the rollers in zone A in a clockwise direction, the trailing end (i.e., the lower left end in FIG. 5) of each roller 186 that is in contact with the container, will be moved upwardly into driving contact with the container while the forward ends (i.e., the right ends of the rollers in zone A) will be moved downwardly away from the container. Thus, the driving forces of the rollers in zone A will be parallel with the axes of the freely rotatably rollers and will be directed upwardly to the right as viewed in FIG. 5. If the clusters 184 of rollers 186 in zone A are driven in a counterclockwise direction the driving force against the container would be downwardly and to the left as viewed in FIG. 5.

The several directions in which a container supported on the platform 150 (FIG. 5) can be driven will now be described.

When it is desired to drive the container to the right (FIG. 5) all shafts in zones A,B,C and D are driven in a clockwise direction (viewed from the bottom of FIG. 5) thus moving the container to the right.

If the container is to be driven to the left, all shafts in zones A,B,C and D are driven in a counterclockwise direction.

If the container is to be driven diagonally, upwardly and to the right at a 45° angle, all of the shafts and their rollers in zones A and D will be driven in a clockwise direction, while the rollers in zones B and C will be held stationary. It will be appreciated that the freely rotatable rollers 186 in zones B and C will provide support but no driving force to the container and will freely roll permitting the container to be driven upwardly and to the right (FIG. 5).

If the container is to be driven diagonally downwardly and to the left, the shafts and their rollers in zones A and D will be driven in a counterclockwise direction and the shafts in zones B and C will be held stationary allowing the supporting rollers in zone B and C to freely roll.

If the container is to be driven diagonally upwardly to the left, the shafts in zones B and C are driven in a clockwise direction and the shafts in zones A and D are held from rotation.

When the container is to be driven diagonally downwardly and to the right, the shafts in zones B and C are driven in a clockwise direction and the shafts in zones A and D are held stationary.

When the container is to be driven in a clockwise direction about a vertical axis, the shafts in zones A and B are driven in a clockwise direction, and the shafts in zones C and D are driven in a counterclockwise direction.

When the container is to be driven in a counterclockwise direction about a vertical axis, the shafts in zones A and B are driven in a counterclockwise direction and the shafts in zones C and D are driven in a clockwise direction.

When the container is to be driven upwardly (FIG. 5), the shafts in zones A and D are driven clockwise, and the shafts in zones B and C are driven counterclockwise.

When the container is to be driven downwardly (FIG. 5) the shafts in zones A and D are driven counterclockwise, and the shafts in zones B and C are driven clockwise.

A fourth embodiment of the invention is illustrated in FIG. 8 and is the same as the third embodiment except that the platform is lengthened to include two additional zones E and F. Accordingly, components of the fourth embodiment, which are identical to those of the third embodiment will not be described in detail, and components of the fourth embodiment that are equivalent to those in the first embodiment will be assigned the same numerals followed by the letter "a".

A platform 150a (FIG. 8) includes zones Aa, Ba, Ca, Da, with two new zones E and F added thereto thereby lengthening the platform to handle longer containers, or longer flat bottomed articles.

Zone E is provided with three shafts 220,222 and 224 journaled to the platform frame 152a. Each shaft has four clusters 184 a keyed thereon with six rollers 186a journaled in each cluster 184 a. The shafts 220,222,224 are driven by a hydraulic motor M5 and chain drives 226,228,230 and are right hand clusters.

Similarly, zone F has three shafts 232,234, 236 journaled to the platform frame 152a with four clusters 184 a keyed thereto that are similar to the clusters on shafts 220,222 and 224 except that the clusters on shafts 232,234 and 236 are left hand clusters as compared to those on shafts 220,222 and 224 which are right hand clusters. A motor M6 and chain drives 238,240, 244 connect the motor M6 to the shafts 232,234,236.

Containers supported on the roller 186a of the longer platform 150a of the fourth embodiment of the invention will primarily be moved longitudinally or transversely of the platform 150. Accordingly, only these functions will be described. It will be understood that the platform may be much longer if desired so that many additional zones may be added thereto for moving a series of containers (or other types of articles) longitudinally of the platform and transfer them off the platform to their right or left at a plurality of different longitudinally spaced stations.

If the container is to be driven to the right (FIG. 8) all shafts in zones Aa, Ba, Ca, Da, E and F are driven in a clockwise direction as viewed from the bottom of FIG. 8.

If the container is to be driven to the left, all shafts in all of the zones are driven in a counterclockwise direction.

If the container is to be driven transversely of the platform 150a in an upward direction (FIG. 8), all of the shafts in zones Aa, Da and E will be driven in a clockwise direction; and all shafts in zones Ba, Ca and F will be driven in a counterclockwise direction.

If the container is to be driven transversely downward (FIG. 8) all of the shafts in zones Aa,Da and E will be driven counterclockwise; while the shafts in zones Ba, Ca and F will be driven in a clockwise direction.

The hydraulic portion of the control circuit of FIG. 9 for driving the motors M1, M2, M3 and M4 of the third embodiment of the invention illustrated in FIG. 5 is as follows:

A hydraulic pump P5 draws fluid from tank T and directs the fluid through conduit 240 which makes the high pressure fluid available to four solenoid operated valves V1,V2,V3 and V4. When the cores of the valves V1–V4 are in their illustrated central positions, the motors M1–M4 are hydraulically locked from movement. When one or more of the valves V1–V4 are shifted by the electrical portion of the circuit of FIG. 9 to their parallel passage position, the associated motors will be driven in a clockwise direction at the same speeds. When one or more of the valves V1–V4 are shifted to their cross passage positions, the associated motors will be driven in a counterclockwise direction.

A circuit for driving the motors M1–M4 in the proper directions, to move the containers directly across the loader platform or to move the containers diagonally across the platform or to rotate the containers about a vertical axis, is shown in FIG. 9. Any one of a plurality of of switches A–F can be closed to actuate two or more of the motors M1'–M4'. The motors which are actuated and the direction of their rotation can be ascertained from FIG. 10. The "input" portion of FIG. 10 includes a plurality of rows of "1's" and "0's" with a "1" indicating a closed switch. In the same row under the "output" portion of FIG. 10 are listed the direction of rotation of two or more motors with a "1" indicating that the motor is actuated and the column indicating a clockwise (C) or counterclockwise (CCW) rotation of the actuated motor. For example, when switch D (FIGS. 9, 10) is closed motor M1 rotates clockwise, motor M2 counterclockwise, motor M3 clockwise and motor M4 counterclockwise. This can also be seen by following signals from switch D (FIG. 9) through a plurality of OR gates 01-05. Exclusive OR gates E1-E8, NAND-gates N1-N4, AND-gates A1-A8, Darlington amplifiers D1-D8 and solenoids S1-S8. The solenoids S1-S8 operate a plurality of valves V1-V4 to connect the hydraulic motors M1-M4 to a hydraulic pump P. The switches may be separate switches or they may be mounted in a "Joy Stick" control.

A combined hydraulic and logic circuit for the fourth embodiment of the invention would be the same as that illustrated in FIG. 9 except that two more solenoid valves and two more portions of the logic circuit would be added to FIG. 9.

Although a container 38 has been illustrated and discussed throughout the specification and claims as the article being controlled by the apparatus of the present invention it will be understood that the term "container" is intended to include any flat bottomed article supported by a platform.

The present invention has been described herein as it is utilized in the platform of an aircraft loader, but it is contemplated that it would also have application to a line conveyor in which articles are reoriented during conveying or to a transfer table in which articles are distributed to a plurality of conveyors. "Container" as used herein is therefore intended to include any article.

While four embodiment of the invention have been illustrated in the drawings, it is to be understood that various changes and modification may be made therein without departing from the spirit of the invention as defined by the scope of the appended claims.

What is claimed is:

1. A conveyor means for directionally controlled translation of an article comprising:
   a frame;
   a plurality of support members rotatably mounted on said frame and arranged substantially parallel to each other;
   said plurality of support members including outer pairs of adjacent members;
   each pair having a plurality of rollers rotatably mounted thereon;
   said rollers on at least the outer pairs of adjacent members being oriented so that the rotational axes are inclined in opposite directions;
   motor means for independently rotating said members; and
   control means for selective actuation of said motor means to cause an article supported thereon to be moved in one of a direction transverse to said members and of a direction axially of said members.

2. The invention according to claim 1, wherein the angles between the rotational axes of said rollers and the rotational axis of the associated member are equal.

3. The invention according to claim 2, wherein each of said angles is 45 degrees.

4. The invention according to claim 1, wherein said rollers are attached in clusters of four with each cluster spaced axially along said members and angularly offset from the adjacent cluster.

5. The invention according to claim 4, wherein said angular offset is 30 degrees.

6. The invention according to claim 5, wherein the angles between each roller and the rotational axis of the associated members are equal.

7. The invention according to claim 6, wherein each of said angles is 45 degrees.

8. A transfer table for selectively translating or rotating an article or container comprising
   a frame;
   a plurality of support members rotatably mounted on said frames and arranged substantially parallel to each other;
   said plurality of support members including outer pairs of adjacent members;
   each member having a plurality of rollers rotatably mounted thereon;
   said rollers on adjacent members of at least the outer pairs thereof being oriented so that their rotational axes are inclined in opposite directions;
   a motor connected to rotatably drive each member in both directions;
   first control means for causing all of said motors to rotate in one direction so that a container is translated transverse to said members.

9. The invention according to claim 8, and further comprising:
   second control means for causing only those motors connected with members having rollers with their axes inclined at the same angle to rotate whereby a container will be moved diagonally on said table.

10. The invention according to claim 9, and further comprising:
    third control means for causing the motors connected with the outer pairs of members to counter rotate so that portion of the container immediately above each of said pairs is moved in the same direction axially of said members.

11. The invention according to claim 10, and further comprising:
    fourth control means for causing the motors connected with the outer pairs of members to counter rotate so that a container is rotated.

12. The invention according to claim 11, wherein said motors are hydraulic motors and are hydraulically locked except when actuated by one of said control means.

13. The invention according to claim 12, and further comprising:
    a centering pad positioned in the middle of said frame; and
    a hydraulic ram connected to said pad and responsive to actuation of said fourth control means to move said pad into contact with bottom of said container.

14. The invention according to claim 12, and further comprising:
    a pair of stub members rotatably mounted on said frame parallel to and between said support members;
    each stub member being a plurality of rollers rotatably mounted thereon with their axes of rotation transverse to said stub members;
    a motor connected to drive each stub member; and
    said fourth control means causing said motors to rotate said stub members in opposite directions.

15. A method of controlling the movement of a container on a platform with a plurality of parallel support members comprising the steps of:
    providing a series of rollers on said members inclined in opposite directions on adjacent pairs of members;
    rotating all of said members to translate said container transverse to said members; and
    rotating only those members having rollers inclined in the same direction to translate said container diagonally on said platform.

* * * * *